United States Patent
Philippe et al.

(10) Patent No.: US 6,350,118 B1
(45) Date of Patent: *Feb. 26, 2002

(54) COMBUSTION ASSEMBLY FOR A FURNACE AND METHOD OF USE

(75) Inventors: Louis Philippe, Oakbrook Terrace; Eric Duchateau, Clarendon Hills, both of IL (US); Dominique Jouvaud, Paris (FR); Robert Plessier, Versailles (FR); Claude Pivard, Paris (FR); Etienne Lepoutre, St. Germain-en-Laye (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/694,032

(22) Filed: Oct. 23, 2000

Related U.S. Application Data

(62) Division of application No. 08/765,885, filed as application No. PCT/FR95/00839 on Jun. 23, 1995, now Pat. No. 6,203,314.

(30) Foreign Application Priority Data

Jun. 8, 1994 (FR) .............................. 94 08451

(51) Int. Cl.[7] .................................. F27B 3/22
(52) U.S. Cl. .................. 432/196; 432/19; 432/146; 431/10; 65/134.4
(58) Field of Search ................. 432/179, 180, 432/181, 19, 146, 149, 196; 65/134.4, 335; 431/10, 164, 179, 180

(56) References Cited

U.S. PATENT DOCUMENTS

| | | | |
|---|---|---|---|
| 4,439,137 A | 3/1984 | Suzuki et al. | 431/8 |
| 4,473,388 A | 9/1984 | Lauwers | 65/134.4 |
| 4,909,733 A | 3/1990 | Yap | 432/195 |
| 5,022,332 A | 6/1991 | Ding | 110/346 |
| 5,139,558 A | 8/1992 | Lauwers | 65/134.4 |
| 5,147,438 A | 9/1992 | Catelain et al. | 65/135 |
| 5,242,296 A | 9/1993 | Tuson et al. | 431/10 |
| 5,346,524 A | 9/1994 | Shamp et al. | 65/134.4 |
| 5,417,731 A | 5/1995 | Leblanc et al. | 65/134.4 |
| 5,601,425 A | 2/1997 | Kobayashi et al. | 431/8 |
| 5,752,452 A | 5/1998 | Leger | 110/346 |
| 5,755,818 A | 5/1998 | Tuson et al. | 431/10 |
| 6,203,314 B1 * | 3/2001 | Philippe et al. | 432/19 |

OTHER PUBLICATIONS

Patent Abstract of Japan, vol. 8, No. 160, (M–312), 1597, Jul. 25, 1984.

* cited by examiner

*Primary Examiner*—Jiping Lu
(74) *Attorney, Agent, or Firm*—Burns, Doane, Swecker & Mathis, L.L.P.

(57) ABSTRACT

Combustion assembly adapted to be placed in a wall of a furnace including an axis having at least one pair of burners with axes, one oxidant lance arranged between the burners of the pair and having a lance axis and a source of oxidant connected to the burners and to the lance.

10 Claims, 1 Drawing Sheet

COMBUSTION ASSEMBLY FOR A FURNACE AND METHOD OF USE

This application is a divisional of application Ser. No. 08/765,885, filed Jan. 8, 1997, U.S. Pat. No. 6,203,314 which is a §371 of PCT Application Ser. No. PCT/FR95/00839, filed on Jun. 23, 1995.

BACKGROUND OF THE INVENTION (i) Field of the Invention

The present invention relates to combustion devices of the type including at least one burner burning a fuel and an oxidant, intended to be placed in a wall of a furnace, as well as to the methods of use of such devices.

(ii) Description of Related Art

Industrial furnaces, traditionally equipped with air-burners burning an air/fuel mixture have recently seen the appearance of oxy-burners, burning a fuel/oxidizer mixture, which are replacing all or some of the conventional air-burners. In the present patent application, "oxidant" is understood to mean a gas mixture having an oxygen content markedly greater than that of air, such as the mixtures sometimes called "superoxygenated air", for oxygen contents of between 40 and 70%, or "impure oxygen" for oxygen contents greater than 85%. Generally, the oxy-burner, like these air-burners, is in the form of an individual device with localized fluid ejection, something which frequently causes temperature profile and heat transfer problems in the zone in question by dint of the flame of the oxy-burner.

SUMMARY AND OBJECTS OF THE INVENTION

An object of the present invention is accordingly to provide a novel design of fuel/oxidizer combustion assembly making it possible to limit the flame temperature peaks and the emissions of nitrogen oxides and to ensure excellent heat transfer in a furnace.

In order to meet this object and others, according to one feature of the invention, the combustion assembly comprises at least one pair of burners and an oxidizer lance arranged between the burners of the pair and having a lance axis, and a source of oxidant connected to the burners and to the lance for supplying same.

According to other features of the invention:

the lance is arranged so that the lance axis is located substantially halfway between the burner axes and typically makes an angle with them of less than 10°;

the distance between two burner axes is between 0.4 and 2 meters, depending on the type of furnace.

The present invention also relates to a furnace, especially a charge melting furnace, including at least one, typically substantially vertical, sidewall comprising at least one combustion assembly as defined hereinabove.

According to other features of the invention:

the burner and lance axes are substantially coplanar;

the angle between the plane of the axes of the combustion assembly mounted in the furnace wall and the horizontal is between −25 and +25°, typically between −20 and +20°;

the furnace comprises two opposite sidewalls, each of which comprises at least one combustion assembly, the combustion assemblies in the opposite walls being arranged so as to substantially face each other.

The present invention also relates to a method of using an assembly as defined hereinabove, in which the oxidant, feeding the burners and the lance, includes at least 88%, typically 90 to 95%, of oxygen.

According to other features of the invention:

the burners of the same pair have the same fuel and oxidant flow rates;

the combustion assembly is fed with the oxidizer in excess, corresponding to a molar concentration of oxygen in the dry products of combustion of between 0.5% and 10%;

impulse (mass flow rate multiplied by the velocity) [sic] of the oxidizer emitted by the lance lies between 0.5 and 3 times the impulse [sic] of the oxidant/fuel flux emitted by a burner.

Other features and advantages of the present invention will emerge from the following description of embodiments, this description being given by way of illustration but in no way implying limitation, and being made with the appended drawings in which:

DETAILED DESCRIPTION OF PREFERRED EMBODIMENTS

Figure 1:
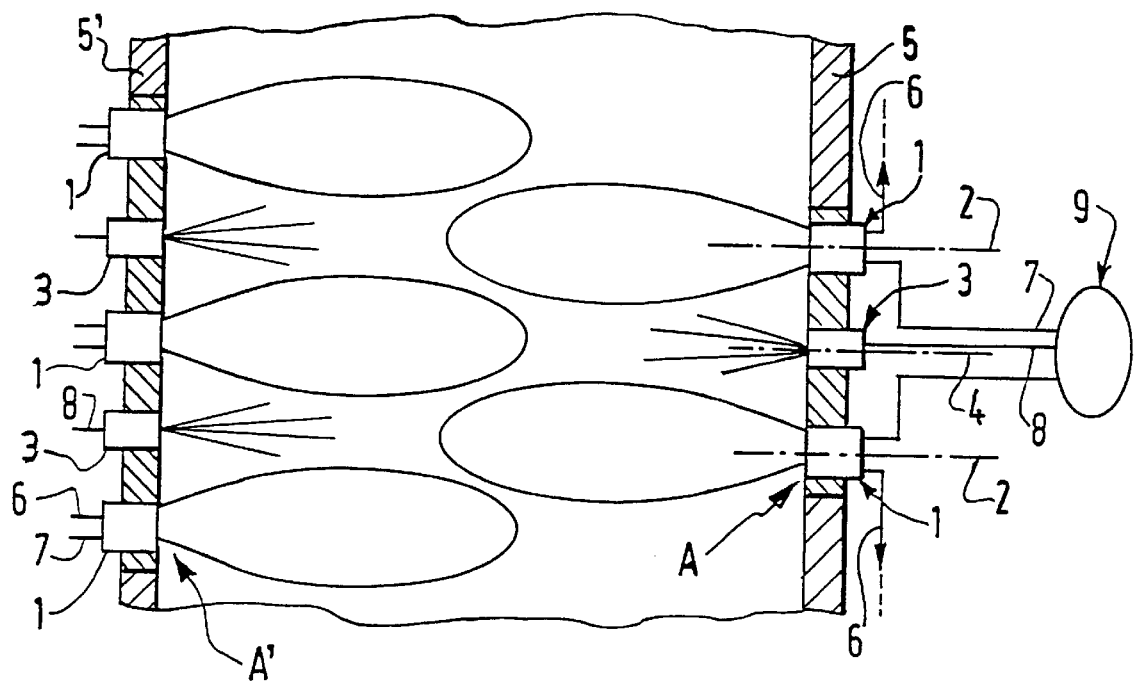
FIG. 1 is a diagrammatic plan view of a charge melting furnace provided with combustion assemblies according to the invention.

In the following description and in the drawings, identical or similar elements bear the same reference numbers, possibly with indices.

Figure 2:
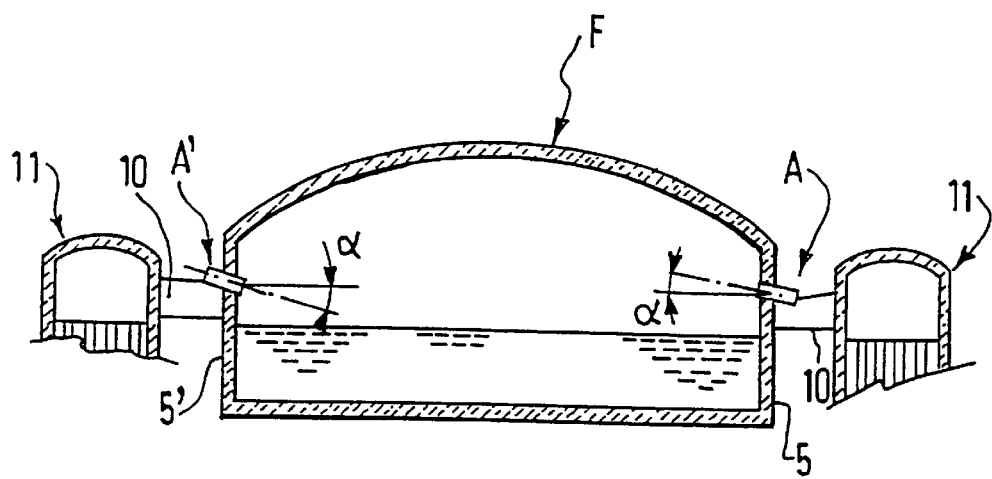
FIG. 2 is a diagrammatic vertical sectional view of a glass melting furnace equipped with combustion assemblies according the invention.

A combustion assembly A according to the invention includes at least one pair of parallel oxy-burners 1, each having a burner axis 2 and at least one oxidizer lance 3, having a lance axis 4, associated with the pair of burners 1. The assembly is mounted in a sidewall 5, 5' of a charge melting furnace, for example a glass melting furnace, so that the axes 2 and 4 are substantially coplanar, this plane making an angle α, positive or negative, with a horizontal plane, as shown in FIG. 2, of between −25 and +25°, typically between −20 and +20°. The lance 3 is arranged between the burners of the pair of burners 1 so that its axis 4 is substantially halfway between the burner axes 2 and possibly makes a lateral angle with them of less than 10°. The burner assembly may comprise three burners 1 and two lances 3 arranged as described above between two adjacent burners constituting, for each lance, a pair of burners, as represented for the assembly A mounted in the furnace wall 5' on the left part of FIG. 1. Depending on the size of the industrial furnaces in question, the distance between two adjacent burners 1 of a combustion assembly A, A' is between 0.4 and 2 meters. Each lance 3 advantageously comprises at least two ejection orifices of the same cross section forming divergent jets separated by an angle of less than 20° and located in the plane of the axes of the combustion assembly.

Each burner comprises respectively fuel and oxidizer feed lines 6 and 7, each lance 3 being provided with an oxidizer feed line 8. According to one aspect of the invention, the oxidizer lines of the same combustion assembly are connected to the same oxidizer supply 9, this oxidizer supply including at least 88%, advantageously between 90 and 95% of oxygen and typically formed by an air separation unit with adsorption, of the so-called PSA (Pressure Swing Adsorption) type. The fuel is advantageously in gas form, typically natural gas, and may also be formed by atomization of liquid fuel by a gas such as the oxidizer or steam. According to one aspect of the invention, the burners of the same combustion assembly have the same fuel and oxidizer flow rates, the total oxidizer flow rate being equal to the theoretical flow rate necessary for complete combustion of the fuel, plus an excess of oxidizer equivalent to a molar concentration of from 0.5% to 10% of oxygen molecules in the dry products of combustion. In each combustion assembly, the oxidizer flow rate of a burner is not greater than 90% of the theoretical flow rate necessary for complete combustion of the fuel ejected by this burner.

The same furnace may comprise one or more combustion assemblies according to the invention in various sections, these combustion assemblies being associated or not being associated with air-burners such as those depicted at 10 and coupled to regenerators 11 shown in the glass furnace F of FIG. 2. In the case of a glass furnace F, as shown in FIGS. 1 and 2, the combustion assemblies A, A' are arranged so as to face each other and are advantageously set up in alternation, on one side and then the other, in the manner of air-burners.

Although the present invention has been described in relation to particular embodiments, it is not limited by them but, on the contrary, is capable of modifications and variants that may be apparent to a person skilled in the art.

What is claimed is:

1. Combustion assembly adapted to be placed in a wall of a furnace comprising an axis comprising
    at least one pair of burners having axes,
    one oxidant lance arranged between the burners of the pair and having a lance axis, the lance axis being located substantially halfway between the burner axes,
    a source of oxidant connected to the burners and to the lance, wherein oxidant flux emitted by the lance at an impulse which is between 0.5 and 3 times the impulse of the oxidant and fuel flux emitted by a burner of the assembly.

2. Assembly according to claim 1, wherein the lance axis makes an angle with a burner axis not exceeding 10°.

3. Assembly according to claim 1, wherein the distance between the two burner axes is between 0.4 and 2 meters.

4. Assembly according to claim 1, wherein the lance is substantially coplanar with the burner axes of the pair of burners.

5. Assembly according to claim 4, wherein the plane of the axes of the assembly and the horizontal are at an angle which is between −25 and +25°.

6. Assembly according to claim 5, comprising two opposite sidewalls and at least one pair of combustion assemblies mounted so as to face each other in the opposite sidewalls.

7. Assembly according to claim 1, wherein the lance comprises at least two divergent oxidant ejection orifices.

8. Assembly according to claim 7, wherein the ejection orifices diverge in the plane of the axes.

9. Combustion furnace comprising at least one sidewall including at least one combustion assembly according to claim 1, said at least one combustion assembly being mounted in the sidewall.

10. Combustion assembly adapted to be placed in a wall of a furnace comprising an axis comprising
    at least one pair of burners having axes,
    one oxidant lance arranged between the burners of the pair and having a lance axis, wherein the lance axis makes an angle with the burner axes not exceeding 10° and
    a source of oxidant connected to the burners and to the lance, wherein oxidant flux emitted by the lance at an impulse which is between 0.5 and 3 times the impulse of the oxidant and fuel flux emitted by a burner of the assembly.

* * * * *